United States Patent
Alasia

(10) Patent No.: US 8,497,221 B2
(45) Date of Patent: Jul. 30, 2013

(54) REFRACTORY BLOCK AND A GLASS MELTING FURNACE

(75) Inventor: Micaela Alasia, Entraigues-sur-Sorgue (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 126 days.

(21) Appl. No.: 13/139,150

(22) PCT Filed: Dec. 17, 2009

(86) PCT No.: PCT/IB2009/055813
§ 371 (c)(1),
(2), (4) Date: Jul. 13, 2011

(87) PCT Pub. No.: WO2010/073195
PCT Pub. Date: Jul. 1, 2010

(65) Prior Publication Data
US 2011/0283742 A1  Nov. 24, 2011

(30) Foreign Application Priority Data
Dec. 22, 2008  (FR) ..................................... 08 58914

(51) Int. Cl.
*C04B 35/484* (2006.01)
(52) U.S. Cl.
USPC ........................................ 501/105; 501/107
(58) Field of Classification Search
USPC .................................. 501/105, 107
See application file for complete search history.

(56) References Cited

U.S. PATENT DOCUMENTS

| | | | |
|---|---|---|---|
| 6,576,580 B2 * | 6/2003 | Gaubil et al. | 501/105 |
| 8,187,990 B2 * | 5/2012 | Avedikian et al. | 501/105 |
| 2007/0015655 A1 * | 1/2007 | Avedikian et al. | 501/128 |
| 2009/0062106 A1 * | 3/2009 | Avedikian et al. | 501/105 |

FOREIGN PATENT DOCUMENTS

| | | |
|---|---|---|
| DE | 27 38 974 A1 | 3/1978 |
| EP | 0 495 662 A1 | 7/1992 |
| FR | 1 208 577 | 2/1960 |
| FR | 75 893 | 7/1961 |
| FR | 82 310 | 12/1963 |
| FR | 2 897 861 A1 | 8/2007 |
| WO | WO 2006/032757 A1 | 3/2006 |

OTHER PUBLICATIONS

Fogaing, E. et al., "Elastic properties and microstructure: study of two fused cast refractory materials," *Journal of the European Ceramic Society*, 2007, pp. 1843-1848, vol. 27.
Ratto, P., "Fused cast refractories of the AZS system: different oxidizing manufacturing methods and their impact on refractory application behavior," *Verre*, Jun. 2002, pp. 22-27, vol. 8, No. 3.
Tribollet, J-C., et al., "How Stresses Develop During Heating Up of AZS Fused-Cast Blocks," *Glass Industry*, Oct. 10, 1995, pp. 26 and 29-32, vol. 76, No. 11.
Dunkl, M., "Studies on the glassy and reaction phases given off by fused-cast AZS blocks and their effects on glass quality," *Glastechnische Berichte*, Nov. 1989, pp. 389-395, vol. 62, No. 11.
International Search Report issued in International Application No. PCT/IB2009/055813 on Feb. 23, 2010 (with translation).

* cited by examiner

*Primary Examiner* — Karl Group
(74) *Attorney, Agent, or Firm* — Oliff & Berridge, PLC

(57) ABSTRACT

The present invention provides a fused refractory product having the following average chemical composition, as a % by weight based on the oxides and for a total of 100%;

$ZrO_2$: 30%-46%;
$SiO_2$: 10%-16%;
$Al_2O_3$: complement to 100%;
$Y_2O_3 \geq 50/ZrO_2$ and $Y_2O_3 \leq 5\%$;
$Na_2O+K_2O$: 0.5%-4%;
CaO: $\leq 0.5\%$; and
other species: $\leq 1.5\%$.

Application to a glass-melting furnace.

9 Claims, No Drawings

REFRACTORY BLOCK AND A GLASS MELTING FURNACE

FIELD OF THE INVENTION

The invention relates to an AZS (Alumina-Zirconia-Silica) fused refractory product.

PRIOR ART

Refractory products include fused products, which are well known in the construction of glass melting furnaces, and sintered products.

In contrast to sintered products, fused products usually include an intergranular vitreous phase interconnecting crystallized grains. The problems that arise with sintered products and with fused products and the technical solutions adopted to overcome them are thus generally different. Hence, a composition developed in order to produce a sintered product is not, a priori, suitable per se for the production of a fused product, and vice versa.

Fused products, routinely termed "electrofused", are obtained by melting a mixture of appropriate starting materials in an electric arc furnace or using any other technique that is suitable for such products. The molten material is then cast into a mold and the product obtained is then subjected to a controlled cooling cycle.

Fused products include electrofused AZS products, i.e. comprising mainly alumina ($Al_2O_3$), zirconia ($ZrO_2$) and silica ($SiO_2$), which have been known for many decades. U.S. Pat. No. 2,438,552 describes one of the first improvements to that type of product. The authors recommend adding $Na_2O$ (1%-2.2%) and MgO/CaO (0.2%-0.80) in order to overcome problems regarding feasibility concerning products comprising less than 70% of $Al_2O_3$, 14% to 40% of $ZrO_2$, and 9% to 12% of $SiO_2$.

AZS products currently sold by Saint-Gobain SEFPRO, such as ER-1681, ER-1685 or ER-1711, contain 45% to 50% of $Al_2O_3$, 32% to 41% of $ZrO_2$, 12% to 16% of $SiO_2$, and approximately 1% of $Na_2O$.

Those products are well suited to the production of glass furnaces. More particularly, current AZS products are principally used for zones that are in contact with the molten glass and also for the superstructure of glass furnaces.

Said products perform well, but there is a constant need for improving the running conditions of glass furnaces, as well as the quality of the glass.

In particular, blocks of fused AZS product constituting the cells of glass furnaces are subjected to a higher temperature in contact with molten glass than outside the cell. In operation, the contact between two adjacent cell blocks occurs only in a zone corresponding to a temperature close to the maximum expansion temperature of the blocks. Thus, it is a critical zone in which corrosion by glass must in particular be avoided.

Such corrosion is correspondingly reduced when the temperature in that contact zone is lower and when the glass is less viscous.

Thus, there is a need for a fused AZS product having dilatometric behavior that allows the temperature in the critical zone of the cells of a glass furnace to be reduced while retaining good feasibility.

The present invention aims to satisfy that need.

SUMMARY OF THE INVENTION

More particularly, the invention provides a fused refractory product having the following mean chemical composition, as a % by weight based on the oxides and for a total of 100%:

$ZrO_2$: 30%-46%;
$SiO_2$: 10%-16%;
$Al_2O_3$: complement to 100%;
$Y_2O_3 \geq 50/ZrO_2$ and $Y_2O_3 \leq 5%$;
$Na_2O+K_2O$: 0.5-4%;
CaO: $\leq 0.5%$; and
other species: $\leq 1.5%$.

In one embodiment, the $Y_2O_3$ is partially or even completely replaced by one or more oxides selected from $CeO_2$, MgO, $Sc_2O_3$, and $V_2O_5$.

In one embodiment, the $Na_2O$ and/or $K_2O$ are partially or even completely replaced by $B_2O_3$.

A product of the invention may also include one or more of the following optional characteristics:

preferably, $ZrO_2>32%$ and/or $ZrO_2<41%$;
preferably, $SiO_2>11%$ and/or $SiO_2<15%$;
preferably, $Al_2O_3>38%$, or even $Al_2O_3>42%$, and/or $Al_2O_3<52%$, or even $Al_2O_3<50%$;
$Y_2O_3+CeO_2+MgO+Sc_2O_3+V_2O_5 \leq 5%$;
preferably, the $Y_2O_3+CeO_2+MgO+Sc_2O_3+V_2O_5$ content, preferably the $Y_2O$ content is more than $60/ZrO_2$, more preferably more than $70/ZrO_2$.
preferably, the $Y_2O_3+CeO_2+MgO+Sc_2O_3+V_2O_5$ content, preferably the $Y_2O_3$ content, is more than 1.2%, preferably more than 1.5%, more preferably more than 2.0%;
preferably, the $Y_2O_3$ content, or even the $Y_2O_3+CeO_2+MgO+Sc_2O_3+V_2O_5$ content, is less than 4.5%;
the ratio $ZrO_2/Y_2O_3$ and/or the ratio $ZrO_2/(Y_2O_3+CeO_2+MgO+Sc_2O_3+V_2O_5)$ is more than 9 and/or less than 30, less than 25, or even less than 20, less than 15, or even less than 12;
the quantity of $Na_2O+K_2O$ is more than 0.8%, or even more than 1.0% and/or less than 3.0%, less than 2.5%, or even less than 2.0%;
the quantity of $Na_2O+K_2O+B_2O_3$ is more than 0.5%, more than 0.8%, or even more than 1.0% and/or less than 4.0%, less than 3.0%, less than 2.5%, or even less than 2.0%;
the "other species" are impurities; and
the product is in the form of a block.

The invention also provides a method of manufacturing a refractory product in accordance with the invention, the method comprising the following steps in succession:

a) mixing the starting materials in a manner that forms a starting charge;
b) melting said starting charge to obtain molten material;
c) casting and solidifying said molten material by controlled cooling in order to obtain a fused refractory product;
said method being remarkable in that said starting materials are selected so that said fused refractory product has a composition in accordance with that of a product of the invention.

Finally, the invention provides a glass melting furnace including a product in accordance with the invention, in particular a product produced or capable of being produced by means of a method of the invention, in particular in a region of the furnace in which the product might come into contact with molten glass or with gases released by melting of the glass, and particularly in the superstructure (crown).

DEFINITIONS

In general, the terms "fused product", "fused and cast product" or "obtained by melting" are used for a solid product, which may have been annealed, that is obtained by complete solidification, by cooling, of a molten material. "Molten material" is a mass that must be contained in a receptacle in order to retain its shape. A molten material, that appears to be liquid, may contain solid portions, but in insufficient quantity for them to be able to give structure to said mass.

A product of the invention may contain hafnium oxide, $HfO_2$, which is naturally present in sources of zirconia. Its content in the product of the invention is 5% or less, generally 2% or less. As is conventional, the term "$ZrO_2$" means zirconia and these traces of hafnium oxide.

The term "impurities" means inevitable constituents that are necessarily introduced with the starting materials or that result from reactions with those constituents. In particular, oxides of iron or titanium are known to be harmful and their content must be limited to traces introduced with the starting materials as impurities. Preferably, the quantity by weight of $Fe_2O_3+TiO_2$ is less than 0.55%.

Unless indicated otherwise, all of the percentages in the present description are percentages by weight based on the oxides.

DETAILED DESCRIPTION

A product in accordance with the invention may be manufactured in accordance with steps a) to c) described below:
a) mixing the starting materials in a manner that forms a starting charge;
b) melting said starting charge to obtain molten material;
c) solidifying said molten material by controlled cooling in order to obtain a refractory product of the invention.

In step a), the starting materials are determined in a manner that guarantees that the composition of the finished product is in accordance with the invention.

As explained below, the presence of yttrium oxide is necessary in the products of the invention, but its content must not exceed 4.5%; a theoretical explanation of this fact cannot be provided, however.

The $Y_2O_3$ may be substituted by $CeO_2$ and/or $MgO$ and/or $Sc_2O_3$ and/or $V_2O_5$.

The presence of sodium and/or potassium oxide is necessary in order to provide the vitreous phase with suitable physical and chemical properties. The quantity of $Na_2O+K_2O$, however, must not exceed 4%, or the corrosion resistance and/or feasibility would be considerably degraded. The $Na_2O$ and/or $K_2O$ may be substituted by $B_2O_3$.

The presence of calcium oxide is harmful in the products of the invention since it is capable of generating crystals of calcium aluminate in the glassy phase. The presence of these crystals may result in fracture defects in the product. Further, too high a CaO content leads to dissolution of zirconia crystals, which reduces the corrosion resistance of the product. Thus, the CaO content must not exceed 0.5%.

In step b), fusion is preferably carried out using the combined action of a fairly long electric arc, which does not bring about reduction, and stirring to encourage re-oxidation of the products.

In order to minimize the formation of nodules of metallic appearance and to avoid the formation of apertures or crazing in the final product, it is preferable to carry out melting under oxidizing conditions.

Preferably, the long-arc melting method described in French patent FR-A-1 208 577 and in its additions, numbers 75893 and 82310, is used.

That method consists in using an electric arc furnace in which the arc is struck between the charge and at least one electrode that is at a distance from that charge, and in adjusting the arc length so that its reducing action is reduced to a minimum, while maintaining an oxidizing atmosphere above the melt and while stirring it either by the action of the arc per se or by bubbling an oxidizing gas (air or oxygen, for example) into the melt, or by adding substances that release oxygen, such as peroxides, to the melt.

In step c), the molten material is preferably cast into a mold that is adapted to produce a block. Cooling is preferably carried out at a rate of approximately 10° C. per hour.

Any conventional method of manufacturing fused AZS products intended for applications in glass fusion furnaces may be employed, provided that the composition of the starting charge enables products to be obtained that have a composition in accordance with the composition of a product of the invention.

A product of the invention may constitute all or part of a block.

In particular, the block may have a mass of more than 10 kilograms (kg), more than 20 kg, or even more than 50 kg, or more than 150 kg, or more than 300 kg, or even more than 900 kg and/or less than 2 (metric) tonnes. In particular, it may have a mass of approximately 1 tonne.

The shape of the block is not limiting.

The block may have at least one dimension (thickness, length or width) of at least 150 millimeters (mm), preferably at least 200 mm, or even at least 400 mm, or even at least 600 mm, or even at least 800 mm, or even at least 1000 mm, or even at least 1600 mm.

In one advantageous embodiment, the thickness, the length and the width of the block are at least 150 mm, or even at least 200 mm, or even at least 300 mm, or even at least 400 mm.

A product of the invention may also be used in the form of a thin product, i.e. with a thickness in the range 50 mm to 150 mm, in particular a thickness of less than 120 mm, or even less than 100 mm. It may in particular be in the form of a tile.

Preferably, the block or tile forms part of or constitutes a wall or the floor of a furnace, in particular a glass melting furnace.

EXAMPLES

The following non-limiting examples are given in order to illustrate the invention.

In these examples, the following starting materials were used:
CC10 zirconia sold by the Société Européenne des Produits Réfractaires principally containing, on average, by weight, 98.5% of $ZrO_2+HfO_2$, 0.5% of $SiO_2$, and 0.2% of $Na_2O$;
zircon sand containing 33% silica;
AC44 type alumina sold by Pechiney and containing on average 99.4% of $Al_2O_3$;
sodium carbonate containing 58.5% of $Na_2O$; and
yttrium oxide with a purity of more than 99%

The products were prepared using the conventional arc furnace fusion method, and then cast to obtain blocks with a format of 200×400×150 $mm^3$.

A chemical analysis of the products obtained is given in Table 1; it shows the mean chemical analysis, given as a percentage by weight. Alumina, $Al_2O_3$, and impurities constituted the complement to 100%.

Feasibility

For each of the examples, the feasibility of the product was evaluated using a feasibility index, FI. A value of FI equal to 10 corresponds to excellent feasibility (optimized production yield, no defects in parts obtained), values in the range 7 to 9 are indicative of satisfactory feasibility (good production yield, the parts produced having a few small cracks) and values of 6 or less corresponding to an unacceptable yield (disintegrated parts, etc).

Samples were taken from the various examples of the blocks that were produced, in order to carry out the tests.

Measurement of Maximum Expansion Temperature Before Phase Change (Test A)

The graph of expansion as a function of temperature was established and the temperature corresponding to the maximum expansion before zirconia transformation (monoclinic to quadratic) was recorded; it is shown in Table 1.

TABLE 1

| Example | $ZrO_2$ | $SiO_2$ | $Na_2O$ | $Y_2O_3$ | $50/ZrO_2$ | FI | Test A |
|---|---|---|---|---|---|---|---|
| 1 | 36.4 | 12.3 | 1.13 | / | / | 10 | 1093° C. |
| 2 | 37.4 | 11.9 | 1.31 | 0.86 | 1.34 | 10 | 1056° C. |
| 3 | 36.6 | 11.9 | 1.25 | 1.20 | 1.37 | 10 | 1060° C. |
| 4 | 36.6 | 11.1 | 1.35 | 1.94 | 1.37 | 9 | 1050° C. |
| 5 | 40.0 | 12.1 | 1.20 | 2.15 | 1.25 | 8 | 1010° C. |
| 6 | 35.1 | 14.2 | 1.70 | 2.61 | 1.42 | 8 | 1037° C. |
| 7 | 36.0 | 14.0 | 1.40 | 3.05 | 1.39 | 8 | 1019° C. |
| 8 | 35.1 | 13.9 | 1.59 | 3.43 | 1.42 | 8 | 997° C. |
| 9 | 45.1 | 14.0 | 1.35 | 3.72 | 1.11 | 7 | 978° C. |
| 10 | 37.5 | 12.1 | 1.15 | 3.77 | 1.33 | 7 | 961° C. |
| 11 | 39.2 | 11.8 | 1.09 | 5.17 | 1.28 | 5 | 959° C. |

The positive role played by yttrium oxide is confirmed. It is assumed that a minimum quantity is necessary in the product for the positive effect to be significant. The minimum quantity needed increases as the zirconia content decreases: for products with an yttrium oxide content that is greater than the ratio $50/ZrO_2$, a significant reduction in the maximum expansion temperature before the phase change (temperature below 1050° C.) is observed. Thus, corrosion by glass is reduced, the viscosity of the glass is increased and the risks of leakage of the glass are reduced.

Further, above 5% of $Y_2O_3$, the feasibility of the parts becomes unacceptable (Example 11).

Table 1 shows that the compositions of the products in accordance with the invention mean that novel compromises between the feasibility and the phase change temperature can be obtained. To their credit, the inventors have discovered this possibility of obtaining these novel compromises that are of particular advantage in applications to glass melting furnaces.

Further, we have verified that the other properties used in this application remain acceptable, in particular the ability to get rid of defects, corrosion resistance, and bubbling.

A crystallographic analysis of the products of the invention reveals that more than 85% of the zirconia is in the monoclinic form. Thus, the yttrium oxide contents in the products of the invention are much too low for it to play a significant role in stabilizing the zirconia.

Naturally, the present invention is not limited to the embodiments described that are provided as illustrative, non-limiting examples.

In particular, the products of the invention are not limited to particular shapes or dimensions, nor to the application to glass furnaces.

The invention claimed is:

1. A fused refractory product having the following chemical composition, as a % by weight based on the oxides and for a total of 100%:
   $ZrO_2$: 30%-46%;
   $SiO_2$: 10%-16%;
   $Al_2O_3$: complement to 100%;
   $Y_2O_3 \geq 50/ZrO_2$ and $Y_2O_3 \leq 5\%$;
   $Na_2O+K_2O$: 0.5%-4%;
   CaO: $\leq 0.5\%$; and
   other species: $\leq 1.5\%$.

2. A glass melting furnace comprising a product according claim 1.

3. A furnace according to claim 2, wherein said product is disposed in a region of the furnace where it is susceptible of coming into contact with molten glass or with gases released by glass melting.

4. A product according to claim 1, wherein the yttrium oxide content is more than the ratio $60/ZrO_2$.

5. A product according to claim 1, wherein the yttrium oxide content is more than the ratio $70/ZrO_2$.

6. A product according to claim 1, wherein the zirconia content is more than 32% and/or the silica content is more than 11% and/or the alumina content is more than 38% and/or the yttrium oxide content is more than 1.2% and/or the total alkali oxide content, $Na_2O+K_2O$, is more than 0.8%.

7. A product according to claim 1, wherein the zirconia content is less than 41% and/or the silica content is less than 15% and/or the alumina content is less than 50% and/or the yttrium oxide content is less than 4.5% and/or the total alkali oxide content, $Na_2O+K_2O$, is less than 3.0%.

8. A product according to claim 1, wherein the yttrium oxide content is more than 2.0%.

9. A product according to claim 1, in the form of a block having a mass of more than 10 kg.

* * * * *

UNITED STATES PATENT AND TRADEMARK OFFICE
CERTIFICATE OF CORRECTION

PATENT NO. : 8,497,221 B2  
APPLICATION NO. : 13/139150  
DATED : July 30, 2013  
INVENTOR(S) : Micaela Alasia et al.

Page 1 of 1

It is certified that error appears in the above-identified patent and that said Letters Patent is hereby corrected as shown below:

Title Page should read

(75)　Inventors:　Micaela ALASIA, Entraigues-sur-Sorgue (FR);  
Michel Marc GAUBIL, Les Angles (FR)

Signed and Sealed this  
Twenty-first Day of June, 2016

Michelle K. Lee  
*Director of the United States Patent and Trademark Office*

UNITED STATES PATENT AND TRADEMARK OFFICE
CERTIFICATE OF CORRECTION

PATENT NO. : 8,497,221 B2
APPLICATION NO. : 13/139150
DATED : July 30, 2013
INVENTOR(S) : Micaela Alasia et al.

It is certified that error appears in the above-identified patent and that said Letters Patent is hereby corrected as shown below:

Title page Item (12), should read as follows: -- Alasia et al. --.

Signed and Sealed this
Twenty-eighth Day of June, 2016

Michelle K. Lee
*Director of the United States Patent and Trademark Office*